Jan. 30, 1968  L. G. KILMER  3,366,196
GAS EXPLODER SEISMIC WAVE GENERATOR

Filed March 9, 1966  2 Sheets-Sheet 1

INVENTOR
LAUREN G. KILMER
BY McLean, Morton & Boustead
ATTORNEY

Jan. 30, 1968  L. G. KILMER  3,366,196

GAS EXPLODER SEISMIC WAVE GENERATOR

Filed March 2, 1966   2 Sheets-Sheet 2

INVENTOR

Lauren G. Kilmer

BY McLean, Morton & Boustead

ATTORNEY

3,366,196
Patented Jan. 30, 1968

3,366,196
GAS EXPLODER SEISMIC WAVE GENERATOR
Lauren G. Kilmer, Tulsa, Okla., assignor, by mesne assignments, to Sinclair Research, Inc., New York, N.Y., a corporation of Delaware
Filed Mar. 9, 1966, Ser. No. 532,954
9 Claims. (Cl. 181—.5)

ABSTRACT OF THE DISCLOSURE

A small, but highly effective gas exploder having a rigid top and a rigid bottom which, when at rest, are so constructed as to form a chamber between them in which a gas explosion can take place and which are arranged such that relative vertical movement can take place between them. Such vertical movement is, however, preferably limited, particularly by spring means such as air cushions mounted on the top to dampen its movements. Internally, a pair of dynamic seals are provided positioned inside of and adjacent the clearances at the joint between the top and bottom of the gas exploded. The seals are each in the form of a ring of resilient material which is thicker than any possible opening of the clearances at the joint between the top and bottom of the gas exploder such that when a gas is exploded within the exploder the sealing ring is pressed against the clearances of the joint. In order that the movement between the top and bottom of the exploder is not excessive, a valving arrangement is employed to release the force of the exploded gas simultaneously as relative movement between the top and bottom of the exploder occurs. The top and bottom of the exploder are not secured together but are held together by the vacuum in the chamber which is maintained by the valve. A gas supply and charging system and an ignition system complete the exploder.

This invention relates to seismic prospecting and the generation of seismic waves by gas exploders, and more particularly, to an improved lightweight, gas exploder for producing an impulse at the earth-air interface which impulse propagates a seismic wave.

As described in co-pending Kilmer applications Serial No. 187,111, filed April 12, 1962, now U.S. Patent 3,235,027, and Serial No. 314,230, filed October 7, 1963, now U.S. Patent 3,314,497, a gas explosion confined in an expansible chamber acting at the earth-air interface against a large mass positioned above such gas explosion, can be used to impart a compressible pulse to the surface of the earth beneath the gas explosion, thereby initiating a seismic wave. If the explosion is confined in a device having a rigid top (carrying the weight of the large mass) and rigid bottom with vertical extensible sidewalls, the seismic wave generated is useful for seismic prospecting by refraction and reflection techniques, since the pulse imparted to the earth's surface has a high energy content and can be made of extremely short duration.

It has been found, however, that the size and weight of such devices, limits their utility in some areas such as where the transportation is difficult. Such devices are normally about sixty inches in diameter and have a weight of about five thousand pounds to which is added the even larger mass of the vehicle. In accordance with this invention, a small, but highly effective gas exploded is provided. This gas exploder can be constructed having a rigid top and a rigid bottom which when at rest are so constructed as to form a chamber between them in which a gas explosion can take place and which are arranged such that relative vertical movement can take place between them. Such vertical movement is, however, preferably limited. Internally, a pair of dynamic seals are provided positioned inside of and adjacent the clearances at the joint between the top and bottom of the gas exploder. The seals are each in the form of a ring of resilient material which is thicker than any possible opening of the clearances at the joint between the top and bottom of the gas exploder such that when a gas is exploded within the exploder the sealing ring is pressed against the clearances of the joint. Preferably also the top and bottom of the gas exploder form a telescoping joint about their sides in order that the clearances of the joint between the top and bottom can be sufficiently limited to prevent extrusion of the resilient sealing rings outwardly of the clearances of such joint. In order that the movement between the top and bottom of the exploder is not excessive, a valving arrangement is employed to release the force of the exploded gas simultaneously as relative movement between the top and bottom of the exploder occurs. The top and bottom of the exploder are not secured together but are held together by the vacuum in the chamber which is maintained by the valve. In addition to the valve, spring means, particularly air cushions, are mounted on the top to dampen its movements. A gas supply and charging system and an ignition system complete the exploder.

For a more complete understanding of the practical application of this invention reference is made to the appended drawings in which.

Figure 2:
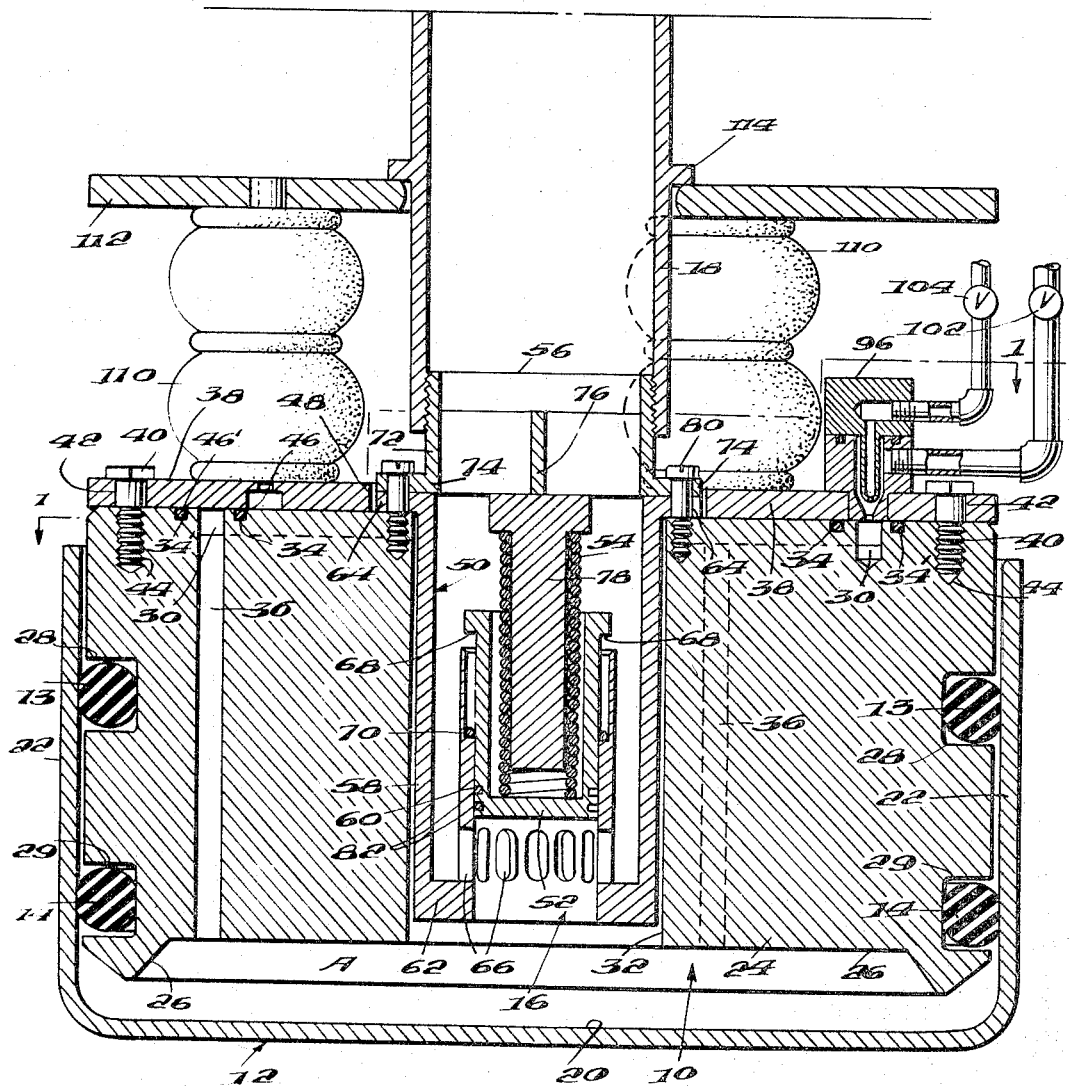
FIGURE 2 is a view taken at line 2—2 in FIGURE 1 with a portion of the bellows bottom mounting plate broken away.

Referring more particularly to FIGURE 2 the gas exploder constructed in accordance with this present invention basically includes a top 10, a bottom 12, a pair of sealing rings 13 and 14, a valve 16 and an exhaust stack 18.

Bottom 12 includes a circular steel plate 20 which at its rim is provided with an integral, upstanding cylindrical flange 22. Top 10 includes an annular, thick-steel plate 24 having an outside diameter slightly smaller than the inside diameter of flange 22 and is further provided with a depressed portion 26 in the bottom thereof as well as two grooves 28 and 29 in the side thereof which grooves contain, respectively, sealing rings 13 and 14. The depressed portion 26 of plate 24 cooperates with bottom plate 20 to form the chamber A of the exploder. Plate 24 also has an annular groove 30 in its upper surface between its outer rim and a central opening 32. Two smaller annular grooves 34 and 34' are arranged in plate 24 on opposite sides of groove 30, see FIGURE 2. Groove 30 is connected to the chamber A by two small, vertical openings 36 disposed at 180° relative to each other about central opening 32. Plate 24 carries a coaxially positioned, generally annular upper plate 38 which is attached to the top side of plate 24 by screws 40 which extend through openings 42 into tapped holes 44 in the plate 24. Plate 38 is approximately of the same diameter as plate 24 and covers groove 30 to form an annular passage. O-rings 46 and 46' in grooves 34 and 34', respectively, seal groove 30. Top plate 38 has an open center 48 positioned coaxially over opening 32 in plate 24 which is somewhat larger than opening 32.

Valve 16 includes a valve body 50, a piston (valve element) 52, a helical spring 54 and a spring retainer cage 56. Generally valve body 50 includes a pair of coaxial cylindrical walls 58 and 60, which are spaced from each other, are closed together at their lower ends by means of an interconnecting annular end wall 62 and are open at their upper ends. The outer sidewall 58 at its upper end is provided with an outwardly extending annular flange 64 and itself has a diameter just less than that of opening 32 such that valve body 50 can be positioned in openings 32 and 48 with flange 64 overlying the top of plate 24. Inner wall 60 has a machined inside surface which is counter-sunk at its upper end and which is provided with a series of apertures 66 adjacent its lower end providing communication between the annular space between walls 58 and 60 and the central opening of valve body 50 lying inside wall 60. Piston 52 which is a machined casting sized to fit snugly but slidingly within cylindrical wall 60 has a flange 68 at its upper end received in the counter bore in the upper end of the interior of wall 60 to limit downward movement of piston 52 at a position in which the lower, closed end seals openings 66 in wall 60. An O-ring 70 cushions flange 68 at the counter bore surface. Piston rings 82 seal the piston 52 at its lower end.

Spring cage 56 is a short steel cylinder 72 which is threaded at its upper end and which has an outwardly projecting, annular flange 74 at its lower end and a pair of intersecting steel cross-plates 76 in its upper interior portion forming a spider to which is secured a depending cylindrical rod element 78. Spring 54 is fitted about rod 78. The cylinder portion 72 of spring cage 56 is positioned above valve body 50 with flange 74 overlying flange 64 and spring cage 56 and valve body 50 are retained in such position by a series of cap bolts 80 received in apertures in flanges 64 and 74 which register with correspondingly disposed tapped bores arranged about opening 32 in plate 24 such that helical spring 54 is retained snugly under compression between the underside of spider 76 and the upperside of the closed bottom of piston 52. The spacing of the flights of spring 54 in this position and the length of piston 52 in relation to the location of spider 76 is such that when piston 52 is displaced upwardly to the maximum compression of spring 54, apertures 66 in sidewall are completely exposed to connect the chamber A with the annular space between walls 58 and 60 of valve body 50 and hence with the exterior of the exploder through spring cage 56 and exhaust pipe 18. Pipe 18 can be a muffler of any conventional construction providing low-pass characteristics desirably having an upper cut-off frequency on the order of five cycles per second and is threadedly received at its open, lower and on the upper end of cylinder 72 of spring cage 56. The top 10 is also dampened or cushioned when it moves upwardly by four spring means, i.e., air cushions 110, which are supported on plate 38. Cushions 110 are also secured to a support plate 112 which loosely fits about exhaust pipe 18 and is adapted to be attached to a stationary element, e.g., the vehicle carrying the device. Plate 112 is pressed against rim 114 on pipe 18 by cushions 110 and plate 112 and rim 114 can serve as a means of carrying the device.

Figures 1, 3:
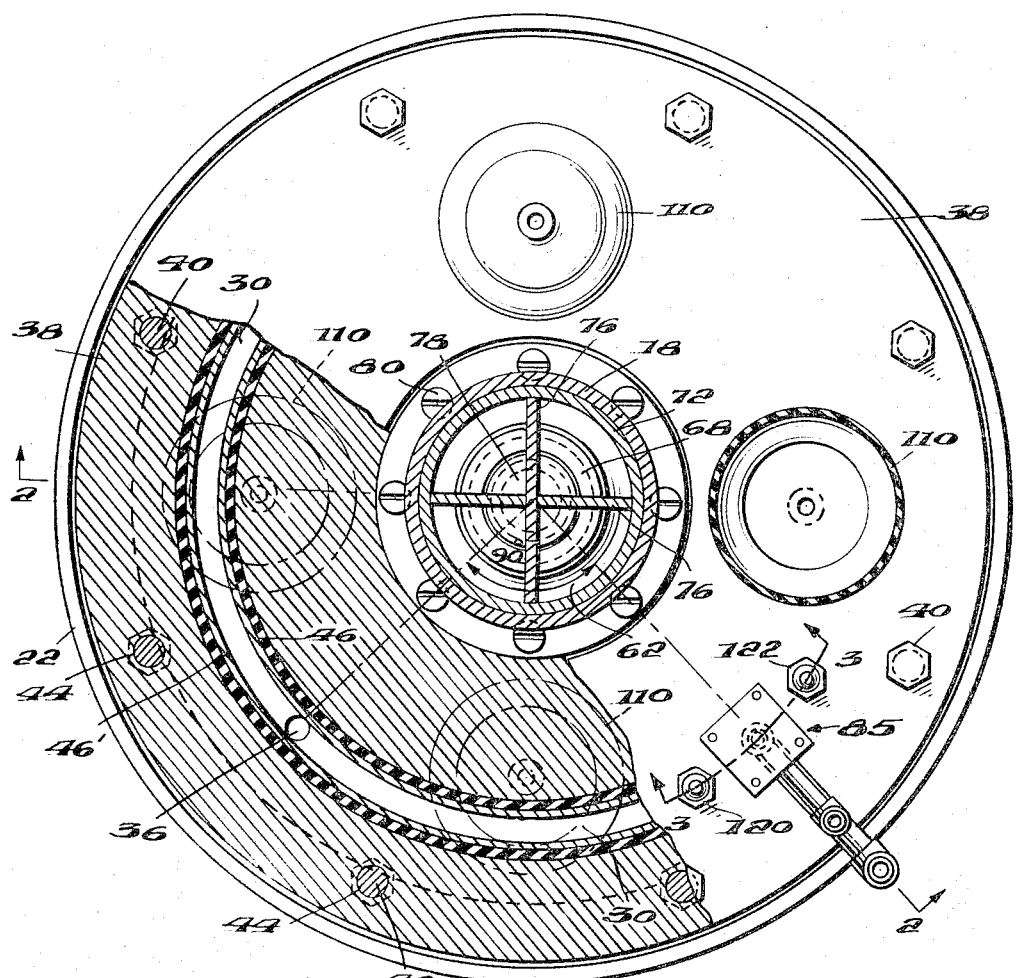
FIGURE 1 is a vertical section of a gas exploder constructed in accordance with this invention.
FIGURE 3 is a sectional view illustrating the firing means of this invention.

Referring to FIGURES 2 and 3 the gas exploder further requires a gas charging system generally designated by the reference number 85 and an ignition system. Charging system 85 basically includes a mixing valve interconnected to groove 30 through an aperture 88 in top plate 38. The mixing valve comprises a member 90 inserted into aperture 88 in plate 38. Member 90 has a central passage 92 and a tapered conical opening 94 which faces groove 30. A top valve member 96 carries a depending tube 98 which is inserted into passage 92 and opening 94 where the spacing of the passage through opening 92 is controlled by the location of tube 98. A passage 100 extends through tube 98 and member 96. Separate valved connections 102 and 104 leading to storage cylinders respectively for propylene, or other suitable combustible gas, and oxygen are connected, respectively, to passages 92 and 100. Two O-rings 106 and 106′ seal member 96 to member 90. The ignition system includes two spark plugs 120 and 122 arranged in apertures 124 and 126, respectively, in top plate 38 on either side of the gas charging system 85. Spark plugs 120 and 122 extend through top plate 38 to communicate with groove 30. Exteriorly the spark plugs 120 and 122, thus mounted, are electrically connected in series across a suitable electrical supply (not shown) which is capable of impressing a high voltage, typically on the order of 70,000 volts, on serially interconnected spark plugs 120 and 122 at any desired instant in time to create a spark at the plugs in groove 30.

In operation the gas exploder is located at a suitable location with the bottom 12 resting on the ground at a spot clear of large stones and other undesirable structure. Typically spring 54 is under sufficient compression such that operation of piston 52 does not occur until a pressure within chamber A on the order of 30 p.s.i.g. has been reached. Valved conduits 102 and 104 are then opened to admit propylene and oxygen until a pressure in chamber A on the order of 2 p.s.i.g. has been achieved. (It will be apparent that a stoichiometric mixture of oxygen and propylene are sought and that this is achieved quite simply by introducing the gases such that the partial pressures of each are in proportion to the molar ratio of a stoichiometric mixture.)

With valved conduits 102 and 104 closed, the exploder chamber A is properly charged and an explosion can be initiated simply by actuating the high voltage source at the desired point in time, whereupon high potential is placed across the two spark plugs 120 and 122 such that combustion of the mixture of gases within groove 30 and the exploder is initiated with a resultant explosion occurring substantially simultaneously with energization of the plugs. Upon explosion of the gases in exploder 10, the initial force of the explosion which is directed against bottom 12 due to the larger mass of top 10 creates the seismic wave of interest. The bottom 12 may be moved downward by this initial force a short distance which depends upon the compressibility of the ground, etc., upon which the exploder 10 rests. As the gases are exploded, however, subsequent to the initial force, the continued expansion of the exploding gases drives the top 10 and its associated equipment upwardly relative to bottom 12 tending to compress cushions 110. O-rings 13 and 14 are also resiliently compressed tightly against the joints formed between the flange 22 and plate 24, generally deforming the rings 13 and 14 against such joints and at the same time lifting the rings with the rising structure supported on and by plate 24.

At the same time as relative movement of the bottom 12 and top 10 occurs, however, piston 52 is lifted at even faster rate to vent the interior of gas exploder chamber A through valve 16 and exhaust pipe 18. This vent action is so rapid that normally the pressure is relieved and top 10 again collapses on bottom 12 within a fraction of a second. After such collapse, the pressure of unvented combustion gases remaining in chamber A between top 10 and bottom 12 is substantially negative to atmospheric, being on the order of five p.s.i.a., and bottom 12 is held onto top 10 as a result of this negative-to-atmospheric pressure. Also, it is unnecessary in subsequent firing to purge the interior of gas exploder when recharging, and recharging is so fast that repetitive firing at significantly rapid rates is feasible.

I claim:
1. A device for propagating a seismic wave at the surface of the earth including means defining a chamber having a rigid pan-like bottom member including a bottom and side wall and a rigid top member telescoping into said bottom to form a joint between the edge of said top member and bottom member side wall, said joint having clearance between said top member and said side wall, a resilient sealing ring disposed in a first groove in the side of said top member inside of said joint positioned against the clearances thereof to seal said joint, a gas charging system including first conduit means formed by a second groove in the top surface of said top member and plate means secured to said top above said second groove, second conduit means connecting said first conduit means to said chamber to provide external communication to said chamber, means for supplying a fuel gas and an oxygen containing gas to said conduit means and means for igniting the gases, and exhaust means for said chamber in- cluding means defining a central opening in said top member providing external communication to said chamber and normally closed valve means positioned in said opening to close said communication therethrough and operable upon a predetermined increase in pressure in said chamber to open thereby communicating said chamber with the exterior of said device.

2. A device as defined in claim 1 wherein there are two said resilient sealing rings disposed in grooves in the side of said top member.

3. A device as defined in claim 1 further including means for dampening upward movement of said top member.

4. A device as defined in claim 3 wherein said dampening means comprises a plurality of air cushions on said plate means.

5. A device for propagating a seismic wave at the surface of the earth including means defining a chamber having a rigid pan-like bottom member including a bottom and side walls and a rigid top member telescoping into said bottom to form a joint between the edge of said top member and bottom member side wall, said joint having clearance between said top member and said side wall, a pair of resilient sealing rings disposed in separate grooves in the side of said top member inside of said joint and positioned against the clearances thereof to seal said joint, a stationary part, a gas charging system for said chamber including first conduit means formed by a groove in the top surface of said top member and plate means secured to said top above said second groove, second conduit means connecting said first conduit means to said chamber, means for supplying a mixture of fuel gas and oxygen-containing gas to said conduit means and means for igniting said mixture, and exhaust means for said chamber including means defining a central opening in said top member providing external communication to said chamber and normally closed valve means positioned in said opening to close said communication therethrough and operable upon a predetermined increase in pressure in said chamber to open thereby communicating said chamber with the exterior of said device, exhaust pipe means secured to the top member above said central opening, and cushion means secured to said part and said plate means for dampening upward movement of said top member, said stationary part comprising annular plate means having said exhaust pipe means extending therethrough and pressed against a rim on said pipe by said cushion means.

6. A device as defined in claim 5 including two O-rings arranged in separate grooves in said top member on either side of said first conduit means between said top member and said plate means.

7. A device as defined in claim 6 wherein said valve means is a spring biased piston valve.

8. A device as defined in claim 7 wherein said mixture supplying means includes a gas mixer attached to said plate means and means for interconnecting said mixer to a source of fuel gas and a source of oxygen containing gas.

9. A device for propagating a seismic wave including means defining a chamber having a rigid pan-like bottom member including a bottom and side wall and a rigid top member telescoping into said bottom to form a joint between the edge of said top member and bottom member side wall, said joint having clearance between said top member and said side wall, a resilient sealing ring disposed in a first groove in the side of said top member inside of said joint positioned against the clearances thereof to seal said joint, a gas charging system including first conduit means formed by a second groove in the top surface of said top member and means sealing the top of said second groove, second conduit means connecting said first conduit means to said chamber to provide external communication to said chamber, means for supplying a fuel gas and an oxygen containing gas to said conduit means and means for igniting the gases, and exhaust means for said chamber providing external communication to said chamber and normally closed valve means positioned in said opening to close said communication therethrough and operable upon a predetermined increase in pressure in said chamber to open thereby communicating said chamber with the exterior of said device.

References Cited

UNITED STATES PATENTS 3,233,694  2/1966  Roever _____ 181—.5

BENJAMIN A. BORCHELT, *Primary Examiner.*

G. H. GLANZMAN, *Assistant Examiner.*